ated May 28, 1974

United States Patent Office 3,813,352
Patented May 28, 1974

3,813,352
EPOXIDE RESIN MIXTURES
Jurgen Habermeier, Pfeffingen, Daniel Porret, Binningen, and Dieter Baumann, Birsfelden, Switzerland, assignors to Ciba-Geigy Corporation, Ardsley, N.Y.
No Drawing. Filed Dec. 26, 1972, Ser. No. 318,154
Claims priority, application Switzerland, Dec. 30, 1971, 19,179/71
Int. Cl. C08g 30/02
U.S. Cl. 260—2 EP          10 Claims

ABSTRACT OF THE DISCLOSURE

New epoxide resin mixtures which contain a major proportion of higher molecular weight N,N'-diglycidyl compounds of oxalkylated cyclic ureide derivatives are obtained by reacting 1 mole of an oxylated cyclic ureide, such as 3 - (2' - hydroxy - n - propyl)-5,5-dimethyl hydantoin, with 1.2 to 3.0 moles of epihalogenohydrin in known manner.

The new epoxide resin mixtures are suitable for the manufacture of moulded articles and coatings with good mechanical properties and, in comparison with the low molecular N,N'-diglycidyl compounds of oxalkylated cyclic ureides, possess the advantage that a slighter exothermicity occurs on gelling and a slighter shrinkage during curing.

---

The present invention relates to curable epoxide resin mixtures of N-heterocyclic diglycidyl compounds, a process for their manufacture and their use.

It is known that it is possible to manufacture the corresponding diglycidyl compounds by reaction of epihalogenohydrin with oxalkylated cyclic ureides, such as 3-(β-hydroxyethyl)-hydantoin or 1,3 - di - (β - hydroxy-n-propyl)-5,5-diethylhydantoin. Such compounds are obtained in accordance with the process described in U.S. Pat. No. 3,629,263 by using a large molar excess of epihalogenohydrin per equivalent NH group or OH group of the oxalkylated cyclic ureide.

Whilst the diglycidyl compounds manufactured in this manner and containing the heterocyclic ring once are valuable epoxide resins which can be converted into mouldings and coatings having good mechanical properties, these resins also show some disadvantages for numerous technical uses. As a result of the relatively high exothermic effect which occurs on gelling these resins, the substrates or articles to be coated can easily become damaged. The shrinkage which occurs during curing of the resin also easily leads to damage or shifting of the articles to be potted and the manufacture of mouldings of large volume which are free of cavities and cracks frequently proves difficult.

It has now been found that these disadvantages can to a large extent be reduced if instead of the known diglycidyl compounds of oxaylated cyclic ureides certain epoxide resin mixtures are used which in addition to the known diglycidyl compounds contain a major proportion of oxalkylated cyclic ureide derivatives containing higher-molecular diglycidyl compounds.

The subject of the present application are epoxide resin mixtures of N-heterocyclic diglycidyl compounds of the formula I

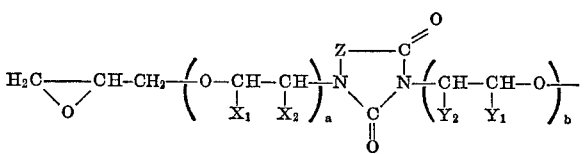

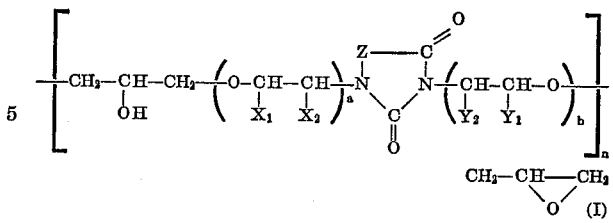

wherein Z denotes an unsubstituted or substituted methylene or ethylene group and $X_1$ and $Y_1$ independently of one another each denote a hydrogen atom, an alkyl group or the phenyl group and $X_2$ and $Y_2$ independently of one another each denote a hydrogen atom or a lower alkyl group, it being possible for $X_1$ and $X_2$ and/or $Y_1$ and $Y_2$ together to denote the trimethylene or tetramethylene group, $a$ and $b$ denote a number of from 0 to 30, preferably 0 to 10, with the sum of $a$ and $b$ having to be at least 1, and $n$ denotes numbers from 0 to 12, preferably 0 to 6, the proportion of the compounds with $n=0$ in the epoxide resin mixture being less than 50 mol percent.

In the formula I, Z can denote one of the following groups:

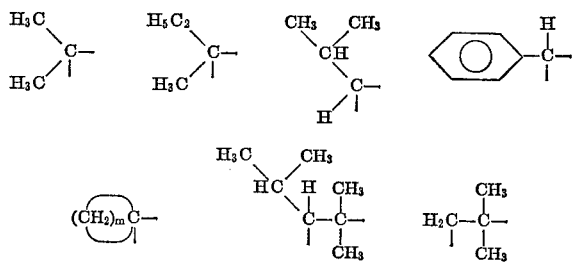

$m=4$ or 5.
Preferably, in the formula I, Z denotes a

group, $X_1$ and $Y_1$ each denote a hydrogen atom or the methyl group, $X_2$ and $Y_2$ each denote a hydrogen atom, $a$ and $b$ denote the number 0 or 1, with the sum of $a$ and $b$ having to be at least 1, and $n$ denotes numbers from 0 to 6, and in the epoxide resin mixture the proportion of the compound with $n=0$ is less than 50 mol percent, preferably less than 30 mol percent.

The epoxide resin mixtures of the formula I are manufactured, according to the invention, by reacting 1 mol of a cyclic ureide derivative of the formula II

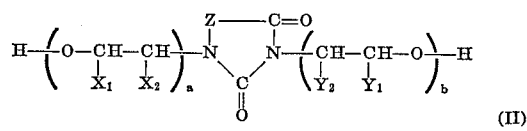

wherein Z, $X_1$, $X_2$, $Y_1$, $Y_2$, $a$ and $b$ have the same meaning as in the formula I, with 1.2–3.0 mols of an epihalogenohydrin, preferably 1.5–2.0 mols of an epihalogenohydrin, in the presence of a suitable catalyst and treating the resulting product containing halogenohydrin groups with agents which split off hydrogen halide.

Preferably, epichlorohydrin is used as the epihalogenohydrin. However, epibromohydrin or β-methylepichlorohydrin can also be used advantageously.

Suitable catalysts for the reaction of the epihalogenohydrin with the cyclic ureide derivative are above all tertiary amines such as triethylamine, tri-n-propylamine, benzyldimethylamine, N,N-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate, methyltriethylammonium chloride, hydrazines with a tertiary nitrogen atom, such as 1,1-dimethylhydrazine, which can also be employed in a quaternized form; alkali halides, such as lithium chloride, potassium chloride or sodium chloride, bromide or fluoride; also, ion exchange resins with tertiary or quaternary amino groups, and ion exchangers with acid amide groups. Basic impurities which can occur in technical commercially available forms of the starting compound can also act as catalysts. In such cases it is not necessary to add a special catalyst.

The reaction of the epihalogenohydrin with the compound of the formula II is as a rule carried out at elevated temperature, for example 60–200° C. Preferably, the reaction temperature is 70–150° C.

In the process, the agents for splitting off hydrogen halide which are used are as a rule strong alkalis, such as anhydrous sodium hydroxide or concentrated sodium hydroxide solution, but other alkaline reagents, such as potassium hydroxide, barium hydroxide, calcium hydroxide, sodium carbonate or potassium carbonate can also be used.

The cyclic ureide derivatives of the formula II used as starting compounds for the preparation of the epoxide resin mixture are known compounds which are obtained by reacting 1 mol of a cyclic ureide of the formula III

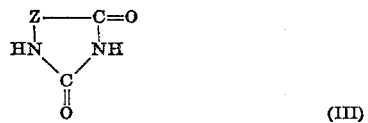

wherein Z has the same meaning as in the formula I, with $(a+b)$ mols of an alkylene oxide, preferably a lower alkylene oxide, such as ethylene oxide or propylene oxide, cyclopentene oxide, cyclohexene oxide or styrene oxide, preferably in the presence of a suitable catalyst.

Suitable catalysts which can be used are both acid and alkaline catalysts. To prepare compounds of the formula II in which the sum of $a$ and $b$ is 1 or 2, alkaline catalysts, such as tertiary amines or quaternary ammonium salts, such as tetraethylammonium chloride, are preferably used. Alkali halides, such as lithium chloride can also be used advantageously as the catalyst for the preparation for such compounds.

In the preparation of compounds of the formula II in which the sum of $a$ and $b$ is greater than 2, it is preferred to start from the simple dihydroxy compounds of the formula II and to add on further alkaline oxides, cycloalkylene oxide or sytrene oxide in the presence of acid catalysts, preferably Lewis acids and their complexes.

The cyclic ureides used for the preparation of the compounds of the formula II are above all hydantoin, hydantoin derivatives, dihydrouracil and dihydrouracil derivatives.

Hydantoin and its preferred derivatives correspond to the general formula

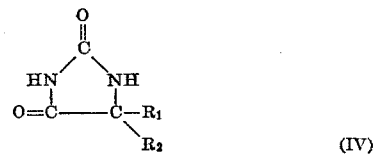

wherein $R_1$ and $R_2$ each denote a hydrogen atom or a lower alkyl radical with 1 to 4 carbon atoms, or wherein $R_1$ and $R_2$ together form a tetramethylene or pentamethylene radical. The following may be mentioned: hydantoin, 5-methylhydantoin, 5-methyl-5-ethylhydantoin, 5-n-propylhydantoin, 5-isopropylhydantoin, 1,3-diaza-spiro-(4.5)-decane - 2,4 - dione,1,3-diaza-spiro(4.4)-nonane-2,4-dione and preferably 5,5-dimethylhydantoin.

Dihydrouracil (=2,4-dioxo-hexahydropyrimidine) and its preferred derivatives correspond to the general formula

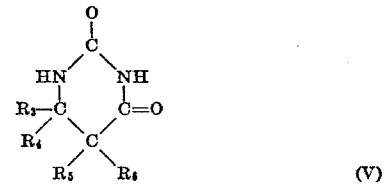

wherein $R_3$ and $R_4$ independently of one another each denote a hydrogen atom or an alkyl group and $R_5$ and $R_6$ both each denote a hydrogen atom or identical or different alkyl groups, preferably with 1 to 4 carbon atoms.

Preferably, in the above formula, $R_3$ denotes a hydrogen atom, $R_4$ denotes a hydrogen atom or a lower alkyl group and $R_5$ and $R_6$ denote methyl groups. The following may be mentioned: 5,6-dihydrouracil, 5,5-dimethyl-5,6-dihydrouracil (2,4 - dioxo-5,5-dimethylhexahydropyrimidine) and 5,5-dimethyl-6-isopropyl-5,6-dihydrouracil (2,4-dioxo-5,5-dimethyl - 6 - isopropylhexahydropyrimidine).

The epoxide resin mixtures of N heterocyclic diglycidyl compounds of the formula I, manufactured according to the invention, are as a rule clear, colorless to slightly brown colored, resins which are of medium to high viscosity at room temperature and do not crystallize out.

The epoxide resin mixtures react with the customary curing agent for polyepoxide compounds and can therefore be cross-linked or cured by addition of such curing agents, analogously to other polyfunctional epoxide compounds or epoxide resins. Preferably, polybasic carboxylic acids and their anhydrides are used for curing the epoxide resin mixtures, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (=methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride, pyromellitic dianhydride or mixtures of such anhydrides.

Furthermore, curing accelerators can be used in the curing reaction. When curing by means of polycarboxylic anhydrides, suitable accelerators are, for example, tertiary amines, their salts or quaternary ammonium compounds, for example, 2,4,6-tris-(dimethylaminomethyl)-phenol, benzyldimethyl amine, 2-ethyl - 4 - methyl-imidazole, 4-amino-pyridine, and triamylammonium phenolate, as well as alkali metal alcoholates, such as, for example sodium hexanetriolate.

The term "curring" as used here denotes the conversion of the epoxide resin mixtures into insoluble and infusible, crosslinked products, and in particular, as a rule, with simultaneous shaping to give mouldings, such as castings, pressings or laminates and the like, or to give coverings, coatings, lacquer films or adhesive bonds.

The curing is as a rule carried out at elevated temperature and, depending on the choice of the curing agent, at temperatures of 50–180° C. If desired, the curing can also be carried out in two steps, by first prematurely stopping the curing reaction, or carrying out the first step at only moderately elevated temperature, whereby a curable precondensate which is still fusible and soluble (a so-called "B-stage") is obtained from the epoxide resin component and the curing agent component. Such a precondensate can serve, for example, for the manufacture of "prepregs," compression moulding compositions or sintering powders.

Accordingly, a further subject of the present invention are curable mixtures which are suitable for the manufacture of mouldings, coverings, coatings, lacquer films or adhesive bonds and which contain the epoxide resin mixtures manufactured according to the invention together with curing agents for epoxide resins, preferably polycarboxylic acids or their anhydrides.

The epoxides resin mixtures manufactured according to the invention, or their mixtures with epoxide resin curing agents, can furthermore be mixed, in any stage before curing, with customary modifiers such as extenders, fillers, and reinforcing agents, pigments, dyestuffs, organic solvents, plasticizers, flow control agents, agents for conferring thixotropy, flame proofing substances and mould release agents.

Especially for use in the lacquer field the polyepoxide compounds according to the invention can furthermore be partially esterified with carboxylic acids such as, in particular, higher unsaturated fatty acids. It is furthermore possible to add other curable synthetic resins, for example phenoplasts or aminoplasts, to such lacquer resin formulations.

The curable mixtures are in particular suitable for use as a casting resin, electrical resin or lacquer resin, and for the manufacture of compression moulding compositions.

In the examples which follow, parts denote parts by weight and percentages denote percentages by weight.

To determine the mechanical properties of the curable mixtures described in the examples which follow, sheets of size 92 x 41 x 12 mm. were manufactured for the determination of the flexural strength, deflection, impact strength and water absorption. The test specimens (60 x 10 x 4 mm.) for the determination of the water absorption and for the flexural and impact test (VSM[1] 77,103 and VSM 77,105 respectively) were machined from the sheets.

Test specimens of sizes 120 x 15 x 10 mm. were in each case cast for determining the heat distortion point according to Martens (DIN[2] 53,458).

MANUFACTURE OF CERTAIN STARTING SUBSTANCES

The poly(oxyalkylene)hydrantoin compounds used in manufacturing Examples 4 and 5 are obtained as follows:

Example A (a) 1,3-bis-(2'-hydroxyethyl) - 5,5 - pentamethylenehydantoin: A solution, cooled to —10° C., of 110 g. of ethylene oxide (2 mols+25% excess) and 300 ml. of dimethylformamide is added over the course of 1 minute to 168.2 g. of 5,5-pentamethylenehydantoin (2.0 mols), 2.2 g. of lithium chloride and 250 ml. of dimethylformamide at 20° C. internal temperature, while stirring. The mixture is then slowly warmed to 90° C. internal temperature over the course of 5.5 hours and is subsequently stirred for a further 5 hours at 90° C. to complete the reaction. The reaction mixture is filtered at room temperature and the clear brown filtrate is concentrated on a rotary evaporator under a water pump vacuum, at 100° C. The residue is dried to constant weight at 110° C. and 10⁻¹ mm. Hg and 274 g. of a brown, clear, highly viscous crude product which crystallized on standing at room temperature are obtained. Re-crystallization from water yields the pure diol of melting point 109.6°–111.9° C.

Elementary analysis.—Found: 56.15% C, 7.82% H, 10.91% N. Calculated: 56.23% C, 7.87% H, 10.93 N.

(b) 1,3-bis-(polyoxyethylene) - 5,5 - pentamethylenehydantoin: 158.4 g. of ethylene oxide are passed into a solution of 58.1 g. of 1,3-bis-(2'-hydroxyethyl)-5,5-pentamethylenehydantoin (0.2 mol), 125 ml. of dioxane and 2.5 ml. of BF$_3$-diethyl etherate (containing approx. 47% BF$_3$) at 68°–72° C. internal temperature over the course of 4 hours and 15 minutes and the heat of reaction arising during the addition is removed by cooling. To complete the reaction, the reaction mixture is allowed to react for a further 30 minutes at 70° C. and is then cooled to 20° C., and 5 ml. of aqueous 50% strength sodium hydroxide solution are added. Thereafter 100 ml. of chloroform are added and the cloudy solution is filtered. The clear, brownish filtrate is concentrated on a rotary evaporator under a water pump vacuum and the residue is taken up in 350 ml. of chloroform. This solution is shaken with 50 ml. of 10% strength NaH$_2$PO$_4$ solution, the aqueous phase is separated off and the organic phase is twice washed with 50 ml. of water at a time. After separating off the aqueous phase, the organic phase is dried with 50 g. of magnesium sulphate until it is anhydrous, and is filtered, and the clear, yellow filtrate is concentrated on a rotary evaporator under a water pump vacuum. The solvent remnants are removed at 90° C. and 10⁻¹ mm. Hg and 177.7 g. of an amber-colored clear viscous 1,3-bis-(polyoxyalkyl) - 5,5 - pentamethylenehydantoin are obtained.

The analysis of the product by gelchromatography, and the molecular weight determination, show a numerical average molecular weight of 899, which corresponds to an average sum of $a+b$ (according to the formula I) of 16.6.

Example B (a) 1,3-bis-(2'-hydroxypropyl)-5-methyl-5-ethyl-hydantoin: 151 g. of propene oxide (2.0 mols+30% excess) are added dropwise over the course of 4 hours, whilst stirring to a solution of 142 g. of 5-methyl-5-ethyl-hydantoin (1.0 mol), 2.1 g. of lithium chloride and 330 ml. of dimethylformamide at 61°–65° C. internal temperature (bath temperature 80° C.). Thereafter the internal temperature is slowly raised to 120° C. over the course of 13 hours and 25 minutes. To complete the reaction, a further 5.5 hours at 120°–123° C. are allowed and the slightly cloudy reaction mixture is thereafter filtered, the clear, brownish filtrate is concentrated on a rotary evaporator under a waterpump vacuum and the residue is dried to constant weight at 100° C. and 10⁻¹ mm. Hg. 263.5 g. of a red-brown, clear, viscous crude product, which is purified by vacuum distillation (boiling point $_{0.4}$: 160° C.) are obtained. Yield of pure material: 211.3 g. (82.0% of theory).

Elementary analysis.—Found: 55.90% C, 8.65% H, 24.83% O, 10.41% N. Calculated: 55.79% C, 8.58% H, 24.78% O, 10.85% N.

(b) 1,3-bis-(polyoxypropylene)-5-methyl-5-ethylhydantoin: 139.5 g. of propene oxide (2.4 mols) are added dropwise over the course of 38 minutes to a solution of 77.4 g. of 1,3-bis-(2'-hydroxypropyl)-5-methyl-5-ethylhydantoin (0.3 mol), 150 ml. of dioxane and 3 ml. of BF$_3$-diethyl etherate at 67° C. to 73° C. internal temperature and the heat of reaction is removed by cooling. The internal temperature is raised to 81° C. (bath temperature 100° C.) and after a further 27 minutes 1.5 ml. of BF$_3$-diethyl etherate are added. After 2 hours and 45 minutes the addition is complete and no further reflux is to be observed (internal temperature 89° C.). The reaction mixture is cooled to 15° C., mixed with 18 ml. of 50% strength aqueous sodium hydroxide solution and stirred for 5 minutes. The yellowish, cloudy solution is concentrated under a waterpump vacuum at 80° C., the residue is dissolved in 300 ml. of chloroform and the resulting solution is extracted by shaking with 90 ml. of 10% strength aqueous NaH$_2$PO$_4$ solution and is separated off. The organic phase is twice washed with 90 ml. of water at a time, the aqueous phases are separated off and the chloroform solution is dried with anhydrous magnesium sulphate and is subsequently filtered. The clear, brownish filtrate is concentrated at 80° C. under a waterpump vacuum and is then dried to constant weight at 95° C. and 10⁻¹ mm. Hg. 170.5 g. of a brownish, viscous, 1,3-bis-(polyoxypropylene)-5-methyl-5-ethylhydantoin are obtained.

---

[1] Verein Schweizerischer Maschinenindustrieller.
[2] Deutsche Industrie-Norm.

The separation of the product by gelchromatography shows an average value of 5.45 for $a+b$ (formula I).

MANUFACTURING EXAMPLES

Example 1

A solution of 1,116 g. (6 mols) of 3-(2'-hydroxy-n-propyl)-5,5-dimethylhydantoin and 14 g. of 50% strength aqueous tetramethylammonium chloride solution in 878.8 g. (9.5 mols) of epichlorohydrin is stirred for 60 minutes at 90° C. A strong azeotropic circulatory distillation is then set up at 145–150° C. bath temperature, by applying a vacuum of 50–90 mm. Hg, in such a way that the temperature of the reaction mixture is 58–61° C. 680 g. (8.5 mols) of 50% strength sodium hydroxide solution are then added dropwise over the course of 150 minutes with vigorous stirring, and at the same time the water present in the reaction mixture is continuously removed azeotropically from the batch, and separated off. Towards the end, the reaction mixture becomes rather viscous. After the dropwise addition of the sodium hydroxide solution, 491 ml. of water have been separated off. The reaction mixture is cooled to 40° C., diluted with 2 litres of chloroform and then cooled to room temperature. The sodium chloride produced in the reaction is removed by suction filtration. To remove remnants of sodium chloride and of sodium hydroxide the solution is twice washed with 250 ml. of water and concentrated on a rotary evaporator at 50–60° C. under a waterpump vacuum. 100 ml. of water are then added in order to remove the traces of epichlorohydrin from the mixture by azeotropic distillation; thereafter, this operation is repeated with 100 ml. of toluene. After this, the epoxide resin is dried to constant weight at 65° C./ 0.2 mm. Hg. 1,109.8 g. of a highly viscous pale yellow epoxide resin containing 2.99 epoxide equivalents/kg. are obtained. The gel permeation chromatogram shows that the molecular distribution in the epoxide resin mixture is as follows:

For
$(n=0) \approx 29\%$
$(n=1) \approx 41\%$
$(n=2) \approx 10\%$
$(n \geq 3) \approx 20\%$

Example 2

The experiment according to Example 1 is repeated, but using the following quantities: 1,116 g. of 3-(2'-hydroxy-n-propyl)-5,5-dimethylhydantoin (6 mols), 925 g. of epichlorohydrin (10 mols), 10 g. of 50% strength aqueous tetramethylammonium chloride and 704 g. of 50% strength sodium hydroxide solution (8.8 mols).

The dehydrohalogenation, the working up and the isolation of the product take place according to Example 1, but instead of 2 litres of chloroform 1,700 ml. of epichlorohydrin are used to dilute the highly viscous reaction mixture.

1,191.5 g. of a clear, pale yellow, highly viscous resin of epoxide content 3.0 equivalents/kg. are obtained. The total chlorine content is about 0.4%. The resin has a viscosity of 120 cp. at 120° C. The molecular distribution in the epoxide resin mixture, estimated from the gel permeation chromatogram, is as follows:

For
$(n=0) \approx 27\%$
$(n=1) \approx 39\%$
$(n=2) \approx 13\%$
$(n=3) \approx 11\%$
$(n=4) \approx 30\%$ The numerical average molecular weight $\overline{M}_n$, determined by vapor pressure osmometry is 560 (measured in dioxane at 50° C. with "Mechrolab 302 B/Hewlett-Packard").

Example 3

A mixture of 648 g. (3 mols) of 1,3-di-(2'-hydroxyethyl)-5,5-dimethylhydantoin, 740 (8 mols) of epichlorohydrin and 15 g. of 50% strength aqueous tetramethylammonium chloride solution is stirred for 45 minutes at 90° C. Dehydrohalogenation is then carried out exactly analogously to Example 1 with 328 g. (4.1 mols) of 50% strength aqueous sodium hydroxide solution. The working up and isolation of the desired product also take place according to Example 1, but diluting with 300 ml. of epichlorohydrin instead of 2 litres of chloroform. 798 g. of a viscous, clear, yellow resin of epoxide content 3.7 equivalents/kg. are obtained. The total chlorine content is 0.6%.

Example 4

104.8 g. of 1,3-bis-(polyoxyethylene)-5,5-pentamethylenehydantoin (manufactured according to Example A), 11.1 g. of epichlorohydrin (0.12 mol), 0.5 g. of 50% strength aqueous tetramethylammonium chloride solution and 300 ml. of toluene are stirred for 1.5 hours at 90° C. internal temperature. The reaction mixture is then cooled to 60° C. and 10.6 g. of 50% strength aqueous sodium hydroxide solution (0.132 mol) are added dropwise over the course of 155 minutes at approx. 150 mm. Hg, whilst carrying out an azeotropic circulatory distillation and constantly removing the water of reaction. After a further 30 minutes reaction time, the reaction is complete and the reaction mixture is freed by filtration of the sodium chloride produced. The cloudy filtrate is mixed with 350 ml. of chloroform, the mixture is twice washed with 50 ml. of water at a time, the aqueous phase is separated off and the organic phase is concentrated on a rotary evaporator under a waterpump vacuum at 80° C. It is dried to constant weight at 80° C. and $10^{-1}$ mm. Hg and 81 g. of a red-brown, clear, viscous resin of epoxide content 0.51 epoxide equivalent/kg. are obtained. Analysis by gel chromatography shows that the epoxide resin mixture has the following molecular distribution in respect of $n$ (formula I):

For
$(n=0) \approx 35\%$
$(n=1) \approx 45\%$
$(n=2) \approx 14\%$
$(n=3) \approx 4\%$

Example 5

144.6 g. of 1,3 - bis - (polyoxypropylene)-5-methyl-5-ethylhydantoin, manufactured according to Example B, 20.8 g. of epichlorohydrin (0.225 mol), 1.0 ml. of 50% strength aqueous tetramethylammonium chloride solution and 400 ml. of toluene are stirred for 1 hour at 90° C. internal temperature. The mixture is cooled to 60° C. and 19.8 g. of 50% strength aqueous sodium hydroxide solution (0.248 mol) are added dropwise over the course of 130 minutes at 100 to 150 mm. Hg whilst carrying out an azeotropic circulatory distillation. After a further 40 minutes of circulatory distillation, the reaction is complete and the reaction mixture is filtered. The dark brown, clear filtrate is treated with 10 g. of active charcoal at 50° C. and filtered, and the filtrate which has become distinctly lighter is extracted by shaking with 50 ml. of water at 20° C. After separating off the water phase, the organic phase is concentrated on a rotary evaporator at 90° C. under a waterpump vacuum. After drying to constant weight at 90° C. and $10^{-1}$ mm. Hg, 138.3 g. of a red-brown, clear, viscous epoxide resin with 0.38 epoxide equivalents/kg. are obtained. Analysis by gel chromatography showed that the product has the following percentage by weight composition with respect to $n$ (formula I):

For
$(n=0)$ 17 percent by weight
$(n=1)$ 49 percent by weight
$(n=2)$ 21 percent by weight
$(n=3)$ 9 percent by weight
$(n=4)$ 2 percent by weight

EXAMPLES OF APPLICATION

Example 1

100 parts of the epoxide resin manufactured according to Example 2, containing 3.00 epoxide equivalents/kg., are well mixed with 50 parts of hexahydrophthalic anhydride at 100° C. The mixture is cured in an aluminum mould for 4 hours at 100° C. and 14 hours at 140° C. A moulding having the following properties is obtained:

Flexural strength (VSM 77,103) = 12.5 kg./mm.$^2$
Deflection (VSM 77,103) = 3 mm.
Impact strength (VSM 77,105) = 16 cm.kp./cm.$^2$
Heat distortion point according to Martens (DIN 53,458) = 75° C.

Example II 100 parts of the epoxide resin manufactured according to Example 3, containing 3.7 epoxide equivalents/kg., are well mixed with 55 parts of hexahydrophthalic anhydride at 80° C. This mixture is cured in an aluminium mould for 2 hours at 80° C. and 14 hours at 120° C. The resulting moulding has the following properties:

Flexural strength (VSM 77,103) = 12 kp./mm.$^2$
Deflection (VSM 77,103) = 6 mm.
Impact strength (VSM 77,105) = 17 cm.kp./cm.$^2$
Heat distortion point according to Martens (DIN 53,458) = 45° C.

Example III 100 parts of the epoxide resin manufactured according to Example 2, having an epoxide content of 3.0 equivalents/kg., are mixed with 75 parts of hexahydrophthalic anhydride at 120° C. 100 parts of this curable epoxide resin mixture are poured into a cylindrical aluminium mould (diameter: 3 cm., height: 13 cm., wall thickness: 0.1 mm.) and gelled for 1 hour at 120° C. A temperature maximum of 190° C. is measured in the centre of the casting composition.

The abovementioned curable epoxide resin mixture is poured into cylindrical aluminium moulds of 10 cm. diameter and 1 cm. height and cured for 24 hours at 120° C. The total volume shrinkage of the cured mouldings is 1.8%.

COMPARISION EXAMPLE 100 parts of 1-glycidyl-3-(2'-glycidyloxy-n-propyl)-5,5-dimethylhydantoin having an epoxide content of 6.0 equivalents/kg. are mixed with 90 parts of hexahydrophthalic anhydride at 120° C. 100 parts of this curable epoxide resin mixture are poured into a cylindrical aluminum mould (diameter; 3 cm., height: 13 cm., wall thickness: 0.1 mm.) and gelled for 1 hour at 120° C. A temperature maximum of 270° C. is measured in the center of the casting composition.

The abovementioned curable epoxide resin mixture is poured into cylindrical aluminum moulds of 10 cm. diameter and 1 cm. height and is cured for 24 hours at 120° C. The total volume shrinkage of the cured mouldings is 3.6%.

As can be seen from the comparison experiment, the temperature maximum which occurs on gelling the curable epoxide resin mixture according to the invention is about 80° C. lower as compared to the curable epoxide resin mixture manufactured using 1-glycidyl-3-(2'-glycidyloxy-n-propyl)-5,5-dimethylhydantoin, and the cured mouldings show a volume shrinkage which, by comparison, is lower by half.

We claim:

1. An epoxide resin mixture consisting of N-heterocyclic diglycidyl compounds of the formula I $$\left[H_2C\underset{O}{\overset{}{\diagdown}}CH\text{---}CH_2\text{---}\left(O\text{---}CH\text{---}CH\right)_a\text{---}N\underset{\underset{O}{\overset{\|}{C}}}{\overset{Z\text{---}\overset{O}{\overset{\|}{C}}}{\diagup\diagdown}}N\text{---}\left(CH\text{---}CH\text{---}O\right)_b\right]_n\text{---}CH_2\text{---}CH\underset{O}{\overset{}{\diagdown}}CH_2 \quad (I)$$

wherein Z represents a methylene group, an ethylene group, or a group denoted by one of the formulas:

$$H_3C\underset{H_3C}{\overset{H_3C}{\diagdown}}C-,\quad H_5C_2\underset{H_3C}{\overset{H_5C_2}{\diagdown}}C-,\quad \underset{H}{\overset{CH_3\ CH_3}{\diagdown CH\diagup}}C-,\quad \langle O \rangle \overset{H}{\underset{|}{C}}-,$$

$$(CH_2)_m\overline{C-},\quad \underset{CH_3}{\overset{H_3C\ \ CH_3}{\diagdown HC\diagup}}\underset{|}{\overset{H\ CH_3}{\diagdown C-C-}},\quad \text{or}\ H_2C-\underset{CH_3}{\overset{CH_3}{\diagup C-}}$$

wherein $m = 4$ or 5

$X_1$ and $Y_1$ independently of one another each represent a hydrogen atom, an alkyl group or the phenyl group, $X_2$ and $Y_2$ independently of one another each represent a hydrogen atom or a lower alkyl group, or wherein $X_1$ and $X_2$ and/or $Y_1$ and $Y_2$ together form the trimethylene or tetramethylene group, $a$ and $b$ denote a number from 0 to 30, with the sum of $a$ and $b$ having to be at least 1, and $n$ denotes numbers from 0 to 12, the proportion of the compounds with $n=0$ in the epoxide resin mixture being less than 50 mol percent.

2. Epoxide resin mixture according to claim 1, wherein in the formula $n$ denotes numbers from 0 to 7.

3. Epoxide resin mixture according to claim 1, wherein the proportion of compounds with $n=0$ is less than 30 mol percent.

4. Epoxide resin mixture according to claim 1, wherein in the formula Z represents one of the following groups:

$$H_3C\underset{H_3C}{\overset{H_3C}{\diagdown}}C-,\quad H_5C_2\underset{H_3C}{\overset{H_5C_2}{\diagdown}}C-,\quad \underset{H}{\overset{CH_3\ CH_3}{\diagdown CH\diagup}}C-,\quad \langle O \rangle \overset{H}{\underset{|}{C}}-,$$

$$(CH_2)_m\overline{C-},\quad \underset{CH_3}{\overset{H_3C\ \ CH_3}{\diagdown HC\diagup}}\underset{|}{\overset{H\ CH_3}{\diagdown C-C-}},\quad H_2C-\underset{CH_3}{\overset{CH_3}{\diagup C-}}$$

$m = 4$ or 5.

5. Epoxide resin mixture according to claim 1, wherein in the formula $a$ denotes the number 0 or 1 and $b$ denotes the number 1.

6. Epoxide resin mixture according to claim 1, wherein in the formula the sum of $a$ and $b$ is 3 to 20.

7. Epoxide resin mixture according to claim 1, wherein in the formula $X_1$ and $Y_1$ each represent a hydrogen atom or the methyl group and $X_2$ and $Y_2$ each represent a hydrogen atom.

8. A curable mixture consisting essentially of (a) epoxide resin mixture of heterocyclic N,N'-diglycidyl compounds according to claim 1 and (b) an epoxide resin curing agent.

9. Curable mixture according to claim 8, wherein a polycarboxylic acid or a polycarboxylic anhydride is used as the curing agent.

10. Curable mixture according to claim 9, wherein hexahydrophthalic anhydride is used as the polycarboxylic anhydride.

References Cited
UNITED STATES PATENTS

| | | | |
|---|---|---|---|
| 3,629,263 | 12/1971 | Batzer et al. | 260—257 |
| 3,631,221 | 12/1971 | Batzer et al. | 260—830 TW |

WILLIAM H. SHORT, Primary Examiner

E. A. NIELSON, Assistant Examiner

U.S. Cl. X.R.

260—2 EC, 2 EA, 78.4 EP, 830 TW